FIP4102 XR 2,616,080

Oct. 28, 1952 J. H. HOMRIGHOUS 2,616,080

TIME DIVISION MULTIPLEX RADIOPHONE SYSTEM

Filed March 5, 1948 4 Sheets-Sheet 1

INVENTOR.

John H. Homrighous

Oct. 28, 1952 J. H. HOMRIGHOUS 2,616,080

TIME DIVISION MULTIPLEX RADIOPHONE SYSTEM

Filed March 5, 1948 4 Sheets-Sheet 2

INVENTOR.

John H. Homrighous

Oct. 28, 1952 J. H. HOMRIGHOUS 2,616,080

TIME DIVISION MULTIPLEX RADIOPHONE SYSTEM

Filed March 5, 1948 4 Sheets-Sheet 3

INVENTOR.

John H. Homrighous

INVENTOR.

UNITED STATES PATENT OFFICE 2,616,080

TIME DIVISION MULTIPLEX RADIOPHONE SYSTEM

John H. Homrighous, Oak Park, Ill.

Application March 5, 1948, Serial No. 13,243

44 Claims. (Cl. 343—204)

This invention relates to a radio communication system and more particularly to a two-way time division multiplex communication system.

One of the main objects of my invention is to provide a time division two-way radiophone system wherein station control pulses, comprising a different pulse for each station or each group of stations in the system, may be produced at the master station and transmitted to satellite stations for controlling the transmission and reception of message signals over different time division multi-channel paths.

Another object is to provide improved means for the transmission and reception of a plurality of two-way messages between different pairs of stations over carrier waves of like frequency.

An additional object is to provide means in a satellite station upon reception of station control pulses to select two periods of time, one period for the reception of message signals and a second period for the transmission of message signals.

To provide each satellite transmitter-receiver station in a communication system with a plurality of time division channels, one for the reception of station control signals, a second channel for the reception of speech signals, and a third channel for the transmission of speech signals is another object of my invention.

Another object is to provide improved means at each satellite transmitter-receiver station to select the particular channels associated with any other satellite station to signal and afterwards talk to the party at the desired station.

Another object of my invention is to provide an improved radio communication system for communication between mobile radio stations, and between mobile, fixed, and/or mobile and fixed stations.

Another object is to provide an improved radiophone system wherein subscribers at any two satellite stations may signal an operator and through the operator's cord circuit communicate in secrecy over carrier waves of the same frequency.

To provide multitime division channels for each of a number of satellite radiophone stations with means at a master station to repeatedly transmit a plurality of series of different pulses over certain of the channels, with each series of pulses selecting a different one of the stations for the reception and transmission of message signals is another object of my invention.

To double or more than double the number of stations with code ringing selectors that may be secretly signaled over a carrier wave is an additional object of my invention.

Another object is to provide means in a mobile radiophone station to transmit signals over a part-time carrier wave path or in recurring periods of time to actuate machine switching equipment in a distant telephone office for establishing a communication path to a telephone subscriber.

Still another object of my invention is to provide an improved radiophone system for transmitting fragmentary portions of alternating current signals over a separate channel in a multichannel signaling and message carrier wave path to maintain a line relay at a distant office energized, or intermittently energized according as the alternating current is interrupted by manipulation of a dial in accordance with the number of a desired telephone subscriber.

A message in this specification is to be understood to include any intelligence or any portion of any intelligence representative of voice controlled electrical signals and any coded electrical signals.

A channel in this specification is to be understood as a track or course for the transmission of electrical signals between distant stations, or a track or course for the transmission of electrical signals during recurring periods of time, and may be one of a number of channels in a transmission path for the transmission of signals representative of any intelligence.

A path in this specification is to be understood as comprising a plurality of channels for the transmission of message and related signals.

There have been developed radiophone systems wherein a number of stations may be individually signaled over carrier waves of like frequency in different recurring periods of time. Also other systems wherein a number of stations having code ringing selectors may be individually signaled through operation of the ringing selectors have been developed. But in this latter system signaling and talking between a pair of stations may utilize the entire transmitting time for the carrier wave. In the instant case a greater number of paths for two-way signaling and talking may be provided over a single carrier wave between stations having code ringing selectors. Also in the instant case a plurality of stations may each be assigned individual paths of several channels, whereby a number of the stations may be secretly signaled for simultaneous two-way conversations.

The present practice of having the fixed radio stations in a system transmit on relatively high power and the mobile stations transmitting at relatively low power on a different carrier wave may be more economical from the mobile station equipment standpoint. This two carrier system as well as a one carrier system may be used in the instant case, but, with different part-time paths in the carrier for each station or each group of stations in the system.

So far as is known this is the first time that two or more radiophone subscribers may simultaneously dial different telephone subscribers' numbers over the same carrier wave or carrier waves of the same frequency to establish signaling and talking paths to different machine switching telephone subscribers.

One of the main advantages of the present time division multiplexing system is in developing station control pulses in the master station only and transmitting these pulses over a carrier wave common to a plurality of stations, requiring a minimum of change in present radiophone station equipment and a maximum use of carrier wave frequencies.

In the present multi-path, multi-channel per path, carrier wave radiophone system, I develop different spaced timing pulses or station control pulses at the master station, one for each station or group of stations per carrier wave frequency, and transmit these pulses for utilization by the several stations in the system. These station control pulses may condition the satellite stations one at a time for the reception and transmission of message signals including ringing and dialing signals.

The time division radio phone system of the present invention is applicable to many communication services by wireless transmission such as police networks, public utility networks, forest protection, bus and taxi networks, and from the description to follow, it will be apparent that there are many other possibilities.

The instant radiophone system may comprise a plurality of stations each assigned two incoming channels, one channel for control pulses and a second channel for message signals, and an outgoing channel for transmitting control and message signals, so that a number of two way communications may be taking place at the same time over carrier waves of the same frequency transmitted intermittently. One wave length may be employed for a relatively large group of stations, and other wave lengths may be utilized for calling stations in other groups. One station may transmit fragmentary portions of signals representative of a message during selected periods, and the other stations may transmit signals during other selected periods. Likewise the receivers in each station may receive message signals during selected periods.

This invention may be considered as an improvement over the time division multiplex radiophone systems shown in my applications Serial No. 558,931, filed October 16, 1944, now Patent 2,532,719, issued December 5, 1950, and Serial No. 763,251, filed July 24, 1947, now Patent 2,532,310, issued December 5, 1950.

In this invention I employ high or ultrahigh frequency carrier waves amplitude modulated for mobile receivers. However, it is to be understood that the principles involved may be equally applicable to carrier waves of any other wave length. Also frequency or phase modulation may be employed.

Other objects and advantages of my invention will appear from the following description, taken in connection with the accompanying drawings in which.

Figure 1:
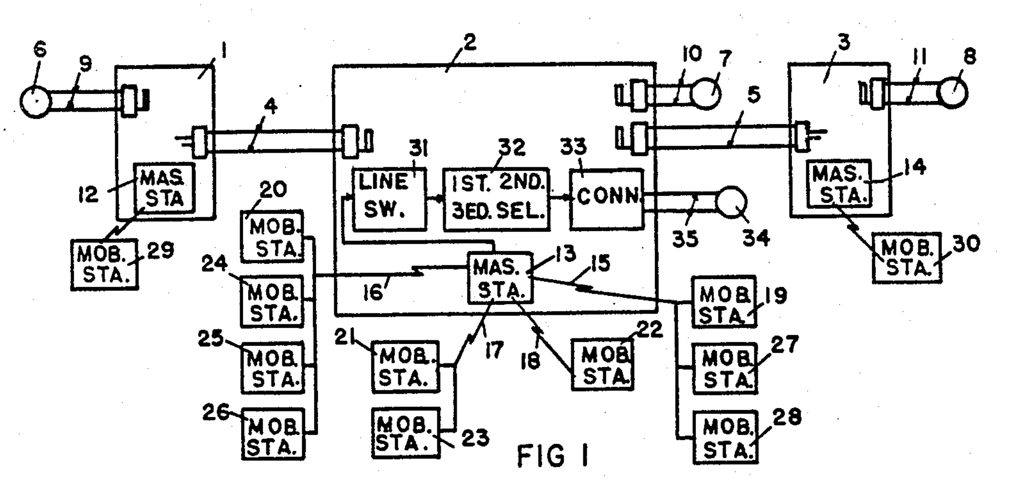
Figure 1 is a diagrammatic illustration of a radiophone system having master stations in telephone offices with groups of mobile satellite stations.

Referring to Figure 1, the numerals 1, 2 and 3 may illustrate diagrammatically three telephone offices connected by trunk lines 4 and 5 terminating in jacks in office 2 and removable plugs in offices 1 and 3. Subscribers' telephone stations 6, 7 and 8 may be connected through lines 9, 10 and 11 to the switchboard equipment in the different offices. Multi-channel carrier wave paths from mobile stations terminating in the master radiophone stations 12, 13 and 14 may be interconnected to both trunk lines and subscribers' lines for two-way communication, to be explained in more detail later.

Each multi-channel path indicated by the lines 15, 16, 17 and 18 may be accessible to only one satellite mobile station, such as 19, 20, 21 and 22 for secret communication over one or two carrier waves or each multi-channel path may have two or four satellite stations as illustrated by stations 21 and 23 for path 17, and stations 20, 24, 25 and 26 for path 16, wherein each station in a multi-channel path group may be signaled by a different frequency of signaling current, or in other words the call bell or alarm member in each station responds only to a certain frequency of signaling current.

Each multi-channel path may also have a relatively larger group of stations such as shown by the stations 19, 27, 28, etc. for the multi-channel path 15, wherein each station may have a ringing selector operated from the master station by manipulation of a dial which may selectively operate the station ringing selectors, to be further explained later.

Any of the mobile stations 19 through 28 may signal an operator at the master station 13 giving her the number of desired telephone subscribers in offices 1, 2 or 3, or the number of mobile stations such as the stations 29 and 30 that may be signaled only through the telephone offices 1 and 3, on account of distance, whereby two-way conversation may proceed between the distant mobile stations, utilizing the trunk lines 4 or 5. While only one mobile station is shown associated with each of the master stations 12 and 14, it is to be understood that these master stations may serve many more mobile stations similar to those described in connection with station 13.

The telephone office 2 may have machine switching equipment instead of manual switchboards as illustrated by the block diagrams 31 for a line switch, 32 for first, second and third step by step selectors, and 33 for a connector to establish connections with desired subscribers such as 34 over a line indicated at 35.

Detail description of the step by step switches is thought to be unnecessary in this application since they are well known in the communication art and may be similar to those shown and described in chapters 1 through 4 of Automatic Telephony by Smith and Campbell, 1914 edition, and chapters 1 to 3 of Telephone Theory and Practice by Miller, 1933 edition, or they may be similar to those shown in Patent 1,586,308 to Homrighous, issued May 26, 1926. While I have shown step by step equipment, it is to be understood that the novel features of this invention may be equally applicable to other machine switching systems, such as "panel" and "crossbar" systems.

Figure 2:
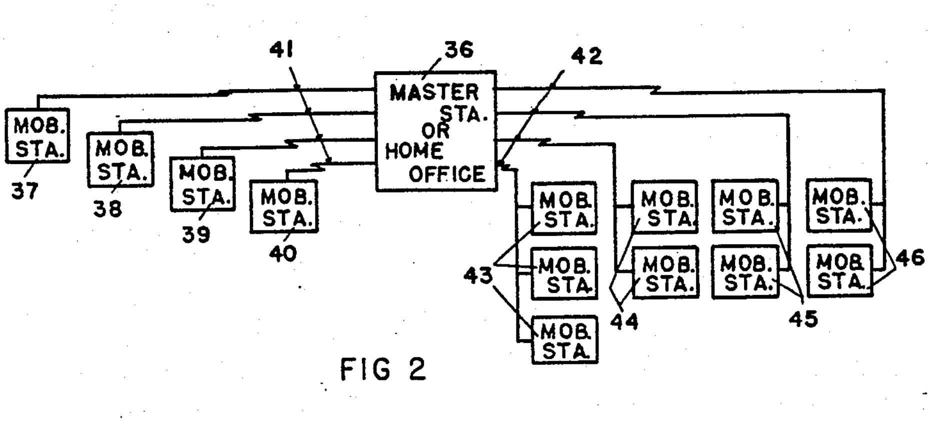
Figure 2 is a diagrammatic illustration of two radiophone systems having a common master station with different groups of satellite stations.

Figure 2 shows two radiophone communication systems or two multi-path, multi-channels per path, carrier wave systems having a master station or home office 36 in common, with means for interconnecting multi-channel paths in both systems for two-way communication between subscribers of both systems. These systems are primarily intended for privately owned communication systems in which it is unnecessary to use telephone lines for establishing connections with distant mobile stations.

Each of the stations 37, 38, 39 and 40 may have a multi-channel path, comprising intermittently interrupted outgoing and incoming channels, over a carrier wave to and from the master station 36, as indicated by the lines 41, for secret two-way communication.

Multi-channel paths, comprising intermittently interrupted outgoing and incoming channels over a carrier wave as indicated by the lines 42 may be associated with groups of satellite mobile stations. Stations 43 may be in one group, stations 44 in a second group, and 45 and 46 may represent the stations in the third and fourth groups. The mobile stations in each group may have individual ringing selectors which in turn may be actuated by dial signals transmitted over the associated paths to selectively actuate the station call or alarm members. The multi-channel path terminal equipment for the master station may comprise answering jacks and removable plugs to interconnect different paths for two-way communications. In the above description of Figure 2, one carrier wave has been assumed for transmitting message signals and necessary control signals between the several stations. However it is to be understood that two carrier waves may be employed for the transmission and reception of message signals and control signals, including dial signals to control telephone machine equipment, to be explained in more detail later.

Figure 3:
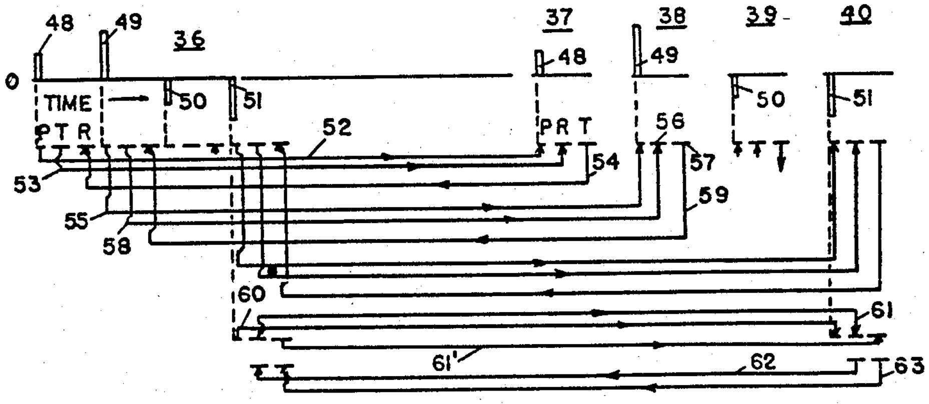
Figure 3 illustrates diagrammatically station control pulses and the different periods of transmitting time for a master station and four satellite stations or four groups of satellite mobile stations.

Figure 3 illustrates diagrammatically the order of occurrence of selected periods of time that may be used in a four station system or a system with four groups of stations for the transmission of station control pulses, message signals and other control signals.

The recurring station control pulses illustrated at 48, 49, 50 and 51 may be produced at the master station 36 and continually transmitted to control or condition the satellite mobile stations in successive rotation for the reception and transmission of message and other signals. The low amplitude positive station control pulse illustrated at 48 may be transmitted over a channel indicated by line 52 to station 37 to in turn condition this latter station in two immediately following periods for the reception and transmission of signals over channels indicated at 53 and 54. Following these periods a high amplitude pulse produced in station 36 may be transmitted in a recurring period or over the channel as indicated at 55 to station 49 which may condition this mobile station in two immediately following periods indicated by the short lines 56 and 57 for the reception and transmission of signals over channels indicated at 58 and 59. Following these latter periods a low amplitude negative station control pulse indicated at 50 and later a high amplitude negative station control pulse indicated at 51 may be transmitted from the master station 36 to control in a similar manner reception and transmission periods in stations 39 and 40. While I have shown the individual stations 37, 38, 39 and 40 under control of the station control pulses, it is to be understood that the pulse 48 shown at station 37 may control or condition a group of stations such as 43 for the reception and transmission of signals and likewise pulses 49, 50 and 51 shown at stations 38, 39 and 40 may also control groups of stations such as the groups 44, 45 and 46.

As mentioned before, two carrier waves may be utilized in the radiophone systems shown in Figures 1 and 2, one to transmit signals from the master station and a second carrier wave utilized by the mobile stations for transmitting signals. One arrangement of time division channels for a two carrier wave system may be as illustrated for station 40. Station control pulse 51 produced at the master station 36 may be transmitted over the channel indicated at 60 to station 40 to in turn condition the mobile station 40 for reception of signals over channels 61 and 61' in the same carrier wave and to transmit signals over channels 62 and 63 in a second carrier wave. Channels 63 and 61' may be utilized by the mobile stations to transmit and receive dialing signals for controlling machine switching equipment in the telephone office, all of which will be more fully explained later.

Channels indicated at 61 and 62 may be used to transmit station alarm signals or message signals, while the channel indicated at 62 may be utilized during the same recurring periods of time as the message signal channel indicated at 61; they are for the reception and transmission of signals through different carrier waves.

Figure 4:
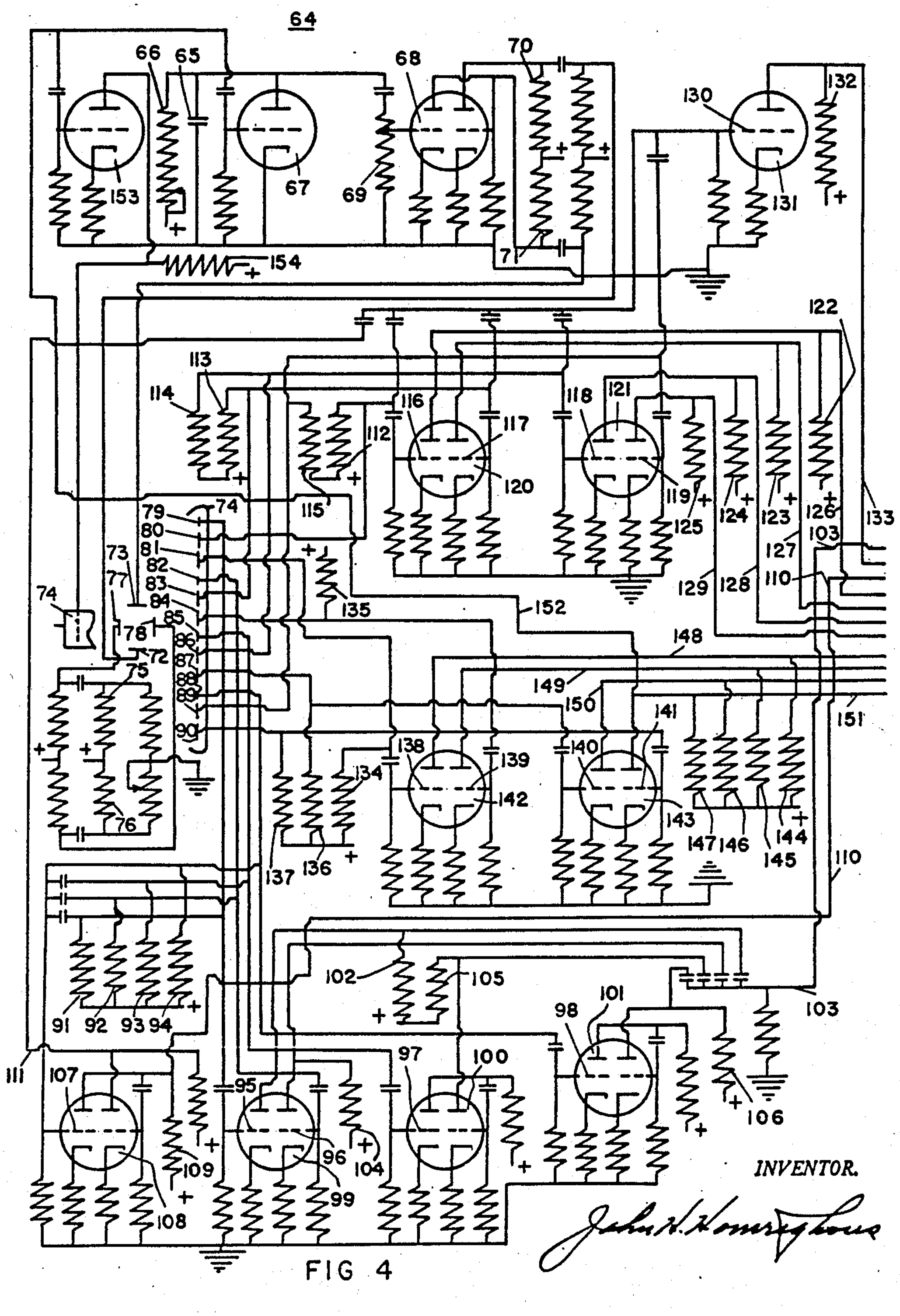
Figure 4 is an electronic pulse generating device with control circuits.

Figure 4 shows apparatus and suitable circuits to produce station control pulses and timing pulses to control the transmission and reception of message and other control signals. The apparatus may comprise a cathode ray tube 74 having a number of anodes arranged in a straight line adjacent the inner screen surface of the tube, an electron ray directed toward the anodes and deflecting plates for deflecting the electron ray over the anodes. The cathode ray tube is very similar to the conventional cathode ray oscilloscope except that there may be a number of spaced plates or anodes aligned near the inner screen surface of the tube. Each anode may be connected to a load resistor to produce station control or timing pulses as the electron ray is deflected over the anodes. Mechanical commutator mechanism may be substituted for the cathode ray tube to produce the control and timing pulses.

The saw tooth generator 64 for producing a series of saw tooth waves for deflecting the electron ray may comprise a condenser 65 charged through a variable resistor 66 from a source of positive potential as indicated. When the condenser 65 becomes charged, the saw tooth wave in the plate circuit of trigger tube 67 may be impressed on the grid of multi-unit tube 68, through an adjustable contact on the resistor 69 for adjusting the amplitude of the saw tooth waves. The saw tooth potentials developed at the load resistors 70 and 71 may be impressed on the deflecting plates 72 and 73 of the cathode ray tube 74 for deflecting the electron ray across the several anodes. The potentials at load resistors 75 and 76 may be impressed on the deflecting plates 77 and 78 and suitably adjusted to position the electron ray on the anodes.

The tube 74 is shown as having twelve anodes 79 through 90. Each set of three anodes, such as 79, 80 and 81 may be utilized to produce the pulses for controlling a three channel path associated with a radiophone station for signaling and talking. The first anode in each group of these anodes, or the anodes 79, 82, 85 and 88 may be utilized to produce the station control pulses which may be transmitted in successive rotation from the transmitter shown in Figure 4 to in turn control the several mobile stations in the system. The remaining anodes may be utilized to control the recurring periods of time for the transmission and reception of message signals.

As the electron ray in tube 74 is deflected over the anodes 79, 82, 85 and 88 a voltage drop is developed at each of the load resistors 91 through 94 which may be applied to the control grids 95, 96, 97 and 98 in the amplifiers 99, 100 and 101. The negative potential on grid 95 may decrease the current through the load resistor 102 thereby producing a relatively low amplitude positive station control pulse which may be applied to conductor 103. The negative potential on grid 96 may cause an increase in potential at load resistor 104 to produce a relatively high amplitude pulse, due to the relatively high A. C. voltage supplied to the load resistor 104, which in turn may be applied to the conductor 103. The negative potential applied to grid 97 after phase reversal in tube 100 may develop a low amplitude negative pulse at load resistor 105, which in turn may be applied to the common conductor 103. The short duration of negative potential applied to the grid 98, after phase reversal in tube 101, may develop a high amplitude negative station control pulse at load resistor 106, which may also be applied to the conductor 103. Therefore the conductor 103 may supply a series of four spaced station control pulses, two positive and two negative, in successive rotation to the transmitter in Figure 5 to modulate a carrier wave, as will be explained later.

Figure 5:
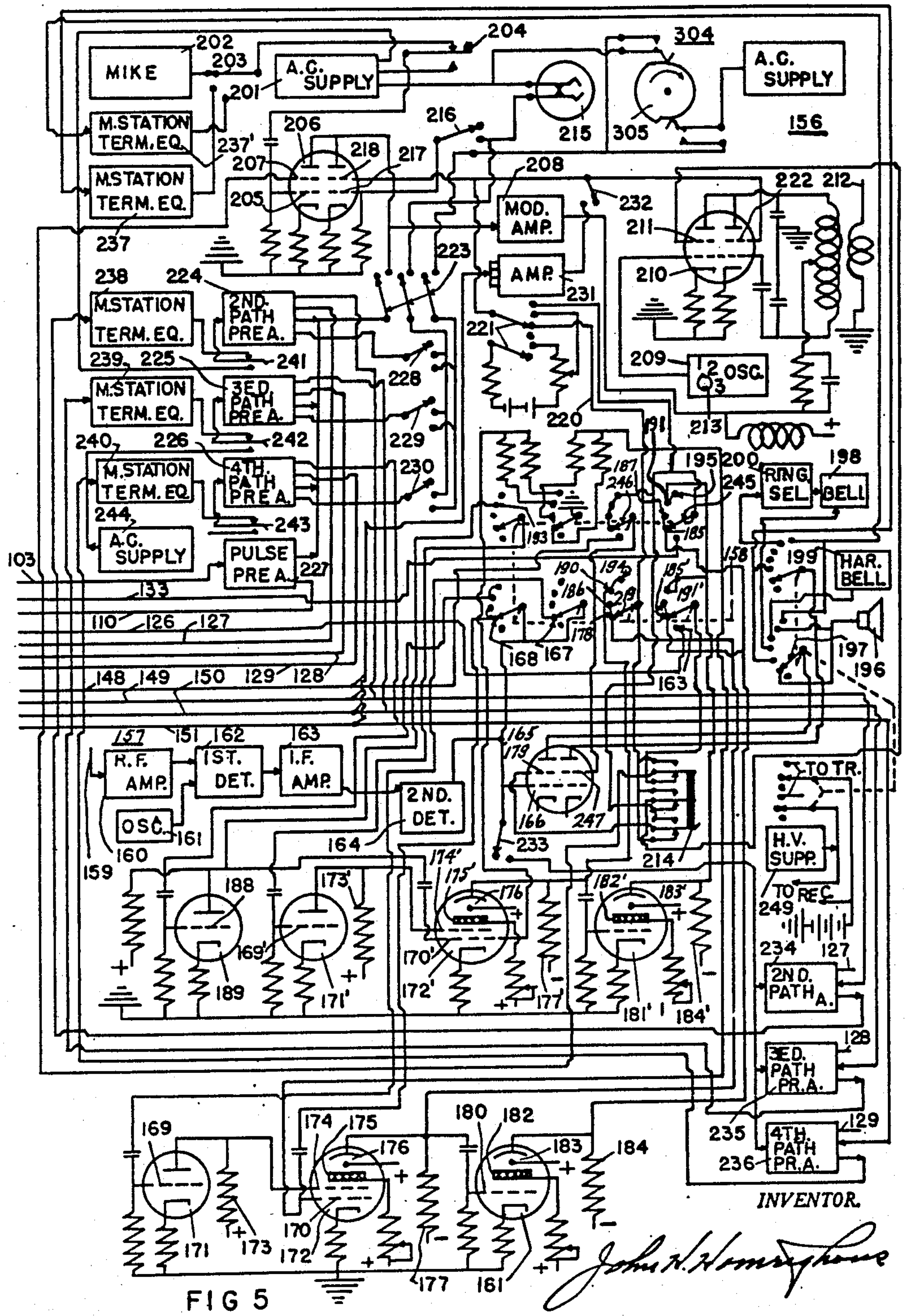
Figure 5 is a block diagram and circuit for transmitter-receiver station.

The potential drop at each of the load resistors 91 through 94 may also be applied in successive rotation to the control grid 107 in the amplifier 108 to in turn produce equal amplitude modulation control pulses or first period timing pulses at the load resistor 109, which may be supplied over conductor 110 to the transmitter in Figure 5 for controlling the modulation of the station control pulses. These modulation control pulses after phase reversal in tube 108 may be applied to the conductor 111.

The transmitting periods in the station of Figure 5 may be controlled by second period timing pulses developed in the load resistors 112 through 115 as the electron ray is deflected over the anodes 80, 83, 86 and 89 which may be applied to the control grids 116, 117, 118 and 119 in the amplifiers 120 and 121. The negative pulse applied to the grid 116 may develop a positive pulse at load resistor 122. Likewise the negative pulses applied to the grids 117, 118 and 119 may develop other positive pulses at load resistors 123, 124 and 125, which in turn may be supplied over conductors 126 through 129 to the transmitter Figure 5 to control modulation of message signals from a master station.

The potential drop at each of the load resistors 112 through 115 may also be applied in successive rotation, with the station control pulses from conductor 111, to the control grid 130 in the amplifier 131, whereby a series of eight transmitting control pulses may be produced at load resistor 132 and supplied to conductor 133, four for controlling the transmission of station control pulses and the remainder to control message signal transmission.

The periods of time for receiving message signals may be controlled by third period timing pulses developed in the load resistors 134 through 137 as the electron ray is deflected over the anodes 81, 84, 87 and 90 which may be applied to the control grids 138, 139, 140 and 141 in the amplifiers 142 and 143. The negative pulse applied to the grid 138 may develop a positive pulse at the load resistor 144, and in a similar manner the negative pulses applied to the grids 139, 140 and 141 may develop other positive pulses at the load resistors 145, 146 and 147 which in turn may be supplied over conductors 148, 149, 150 and 151 to the receiver Figure 5 to control the reception of message signals.

The positive pulse developed at load resistor 147, each time the electron ray impinges the last anode 90, may be applied over conductor 152 to the grid of trigger tube 67 to render this tube conductive, thereby discharging condenser 65 to cause the electron ray to be deflected backward. From the conductor 152 a positive pulse may also be applied to the control grid in tube 153, and after phase reversal in this tube, a pulse developed at load resistor 154 may be applied to the control grid in the cathode ray tube 74 to substantially block the electron ray during retrace.

Figure 5 shows a radio transmitter-receiver station which may be any one of the stations shown in Figures 1 and 2. This station may comprise a transmitter 156, receiver 157, and in master stations an electronic pulse generating device Figure 4. The transmitter when located in mobile or satellite stations may transmit a modulated carrier wave during certain recurring periods of time, and in other cases during any selected recurring period, depending upon what station is called. In the master stations the transmitter may also transmit a series of station control pulses produced in the circuits of Figure 4. The receiver when located in a satellite station may be capable of receiving station control pulses and selecting a particular recurring pulse to control the receiver for the reception of message signals and the transmitter for transmitting message signals in successive periods of time following the reception of the selected station control pulse.

Describing first the receiver for mobile or satellite stations, the station selecting switch 158 may be in its second position as shown in the drawing. The antenna 159 may receive a carrier wave modulated with message and control signals from a master or other station which may be fed to the radio frequency amplifier 160. One antenna may be employed for both the transmitter and receiver since signals are not transmitted and received during the same periods, except in radiophone systems wherein the satellite or mobile station may be equipped with dial mechanism for actuating machine switching equipment at a telephone office; then different carrier may be used.

An oscillator 161 reacts with the carrier wave in the first detector stage 162 on the heterodyne principle to produce an intermediate frequency which is supplied to the intermediate frequency amplifier 163. After suitable amplification in stage 163, the message signals and control signals may be demodulated in the second detector 164. Fragmentary portions of message signals received from the detector 164 may be fed over conductor 165 to the control grid in the power amplifier 166 and station control signals from conductor 165 may be fed through switch contacts 167 and 168 to the control grids 169 and 170 in tubes 171 and 172. The message signals and station control signals may be separated by the periods of time in which they are received.

At the satellite stations the message signal reception and transmitting periods may be under control of station control pulses received from a master station. The master station may transmit in successive rotation through a carrier wave four station control pulses produced in the circuits of Figure 4. These station control pulses like those shown in Figure 3 may be received by all the satellite stations and each satellite station may have suitable apparatus and circuits to select a particular station control pulse to control its transmitting and receiving periods.

The control grid 169 in tube 171 may be biased beyond cutoff to prevent conduction when a low amplitude positive pulse is applied to its control grid 169; therefore negative station control pulses will not cause current flow through the load resistor 173 which in turn supplies positive potential to the grid 174 in tube 172 during reception of all of the station control pulses except the high amplitude positive pulses. A high amplitude pulse on grid 169 may cause a voltage drop at the load resistor 173 which may be applied to grid 174 to render tube 172 nonconductive for the high amplitude positive pulses. However, a low amplitude positive pulse from conductor 165 applied to the control grid 170 may cause current flow through the fluorescent coated anode 175 of relatively slow decay to in turn cause the anode to glow for a relatively short period of time after the duration of the pulse on grid 170, thereby exciting the photo electric cell 176. Current through cell 176 and resistor 177 produces a positive receiver timing pulse or a second period timing pulse which may be fed through switch contact 178 to the grid 179 in the power amplifier 166 rendering this latter tube conductive for message signals from the master station during short periods immediately following the reception of the station control pulse. Resistor condenser networks may be used to produce the receiver timing pulses.

The message signal reception timing pulses may be utilized to produce a later message signal transmission timing pulse for conditioning the transmitter in the satellite station for transmitting message signals modulated on a carrier wave of the same length, or the message signals from the mobile station may be modulated on a carrier wave of a different wave length. Therefore, the pulses produced at the load resistor 177 may also be applied to the control grid 180 in the slow acting tube 181 which in turn may cause current flow through the fluorescent coated anode 182. Current through the anode 182 may cause it to glow for a relatively short period of time after current through resistor 177 is substantially interrupted, thereby exciting the photo electric cell 183. Current through cell 183 and resistor 184 produces a positive message signal transmitting control pulse or a third period timing pulse which may be fed through the switch contacts 185 and 185′ to the grids 211 and 207 in tubes 210 and 206 for controlling the transmitter 156 to transmit message signals during short periods immediately following the reception of message signals in the receiver 157.

The receiver described above responds to a low amplitude positive pulse. By rotating the multiposition switch 158 to its third position, tube 171 may be disconnected from the conductor 165 and the control grid 170 biased beyond cutoff to prevent current flow through tube 172 with low amplitude station control pulses applied to the grid. Tube 172 may now become conductive each time a high amplitude station control pulse is applied to the grid 170 to produce both message signal receiver and transmitter timing pulses as explained above. The receiving control pulse may be fed through switch contact 186 to grid 179 rendering the amplifier 166 conductive for fragmentary portions of message signals from the master station over a second multichannel carrier wave path. The transmitter timing pulses may be fed to the switch contacts 187 and 185′ for controlling the transmitter 156 to transmit message signals during a second period of time following the reception of each high amplitude positive station control pulse.

From the above description it has been shown that two satellite or mobile stations, one under control of low amplitude station control pulses and a second station under control of high amplitude station control pulses, may transmit and receive message signals to and from a master station in different recurring periods of time over carrier waves of the same frequency, or each satellite station may receive and transmit on carrier waves of different frequency.

The tubes 172 and 181 and all other like tubes in this application may be similar to the slow acting tube described in my Patent 2,425,877, issued August 19, 1947. Briefly, this tube may comprise a screen or wire mesh anode coated with fluorescence material of relatively slow decay so that anode current interrupted at a relatively high rate may cause the anode to glow, thereby exciting the photo cell. Current through the cell may be maintained for a short period of time after current through the triode has been interrupted due to the decay time of the fluorescence material and to the brilliancy of the anode which in turn may be controlled by variable potential.

The receiver 157 may be arranged to receive signals through a third multi-channel path by rotating the switch 158 to its fourth position, whereby the conductor 165 may be connected to the grid 188 in tube 189 for phase reversal of the station control pulses applied to its grid. After phase reversal in tube 189, the station control pulses may be applied to the control grids in tubes 171′ and 172′ in the same phase relation as explained for like tubes 171 and 172 with similar parts designated with like numerals primed. Since the operation of tubes 171′, 172′ and 181′ may be similar to that described for tubes 171, 172 and 181, further explanation is thought to be unnecessary. Therefore, low amplitude negative station control pulses after phase reversal in tube 189 may produce message signal receiver and transmitter timing pulses at load resistors 177' and 184' which in turn may be applied to switch contacts 190, and 191 and 191'. The receiving control pulse may be applied to grid 179 to render the amplifier conductive for the reception of message signals over a third multi-channel carrier wave path. The transmitting control pulse may control the transmitter to transmit message signals following each low amplitude negative station control pulse.

The switch 158 may be rotated to its fifth position to arrange the receiver 157 for the reception of signals over a fourth multi-channel carrier wave path and at the same time to arrange the transmitter 156 for transmitting signals over the same path. Switch 158 in its fifth position removes the brush from contact 193 to disconnect the tube 171, and at the same time changes the bias on tube 172', so that high amplitude negative station control pulses applied to the grid of tube 189 may produce at load resistors 177' and 184' both message signal receiver and transmitter timing pulses which may be applied to switch contacts 194, 191' and 195. These receiver and transmitter timing pulses may control the receiver 157 and the transmitter 156 for the reception and transmission of signals over a fourth multi-channel carrier wave path.

The receiver apparatus and circuits for selecting the different station control pulses has been described as located in one station and by rotation of the switch 158 four different pulse selecting circuits may be used, whereby a subscriber at the satellite station may communicate over all of the multi-channel paths one at a time.

For secret communication over each multi-channel path a different pulse selecting circuit may be located in each of four stations: i. e., the low amplitude positive station control pulse selecting circuits including tubes 171, 172 and 181 may be disposed in a first station; high amplitude positive station control pulse selecting circuits including tubes 172 and 181 may be disposed in a second station; low amplitude negative station control selecting circuits including tubes 189, 171', 172', and 181' may be disposed in a third station; and high amplitude negative station control pulse selecting circuits including tubes 189, 172' and 181' may be located in a fourth station.

Message signals received over any one of the multi-channel paths may be fed to the control grid in tube 166, and after suitable amplification in this tube the signals may be supplied to the loud speaker 196, or ringing signals may first be fed through the switch 197 to the call bell 198. Each mobile station in a four station system may have a similar bell which may be actuated in different periods to provide secret signaling. Or there may be four or more mobile stations per multi-channel path with each station having a harmonic bell 199 which responds to a different frequency of ringing current for secret signaling, but the message signal channels would be common to all stations. With a greater number of stations assigned to each multi-channel path, a code ringing selector 200 may be used in each station and actuated by dial interrupted alternating current signals, to be more fully explained later. The code ringing selector may be similar to those now in commercial use.

The transmitter in a mobile or satellite station may comprise a microphone 202 or any other known signal device for developing signals representative of a message which may be fed through the switch 203, key 204 to the control grid 205 in the preamplifier stage 206. The left unit of amplifier 206 may be under control of the transmitter timing pulses received from the receiver 157 through switch contact 185', for the first multi-channel path, and applied to the grid 207. Therefore, fragmentary portions of the message signals applied to the grid 205 may be fed to the modulation amplifier 208 during recurring periods of time according as the timing pulses applied to the grid 207 causes the left unit of tube 206 to become conductive.

An oscillator and associated frequency multiplying circuits 209 may produce a carrier wave in the high or very high frequency band. In the left unit of the power amplifier 210, which may be under control of the transmitter timing pulses received from the receiver 157 through switch contacts 185 and applied to the grid 211, this carrier wave may be modulated by the message signals from the amplifier 208, supplied to the anode circuit of tube 210, and after amplification they may be fed intermittently or in recurring periods of time to the antenna 212. The oscillator 209 may be variably tuned by the dial 213 to produce carrier waves of different length.

By rotating the switch 158 to its third, fourth and fifth positions, transmitter timing pulses may be received from the station receiver through switch contacts 185' and 191' to control the transmitting periods for message signals in the second, third and fourth multi-channel paths.

Therefore, a single satellite station may transmit message signals over any selected multi-channel path by rotating the switch 158, as explained in connection with the receiver. A mobile station in a relatively small radiophone system may be associated with only one multi-channel path for secret communication.

To signal an operator or another station in the same system, key 204 may be operated to apply alternating current to the grid 205 which may be transmitted in place of the message signals from the microphone to actuate an alarm member at the master station as will be explained later. Should another satellite station be signaled, then a bell similar to 198 would be actuated at the called station.

When a first mobile station or master station calls a second mobile station, it will be necessary at the calling station to actuate the key 214 in order to reverse the transmitting and receiving periods at the calling station so that the calling station may transmit signals in the same recurring periods that the receiver is capable of receiving them.

The mobile stations may be provided with a dial, similar to a telephone dial, as shown at 215, to produce interrupted dialing signals that may be utilized in the master station terminal equipment for actuating machine switching equipment in a distant telephone office. The switch 216 may be closed to provide alternating current from the source 201 through the dial 215 to the control grid 217 in the right unit of tube 206. Two different frequencies of alternating current may be alternately applied, by another dial, 304, to grid 217 for actuating code ringing selectors used by the telephone company. This right unit may be under control of the grid 218 which may receive receiver or third period channel timing pulses from the receiver at brush 245 through conductor 220 and the switch 221 in order that fragmentary portions of alternating current signals may be fed to the amplifier 208 in recurring periods of time or through an individual channel without interference from message or ringing signals. Manipulation of the dial 215 may interrupt these signals in spaced intervals according to the digits dialed. These same receiver timing pulses may be applied to grid 222 to also control the right unit of the amplifier 210 so that the A. C. signals modulated on a carrier wave may be transmitted through an individual channel. The satellite station may transmit these dialing signals in a recurring period of time corresponding to the recurring period that dialing signals are received from a distant station but over a different carrier wave, as explained in connection with Figure 3. The switch 221 may be operated to its second position to maintain a voltage drop on the grids 218 and 222 in the satellite stations not requiring dialing facilities for machine switching telephone subscribers.

The description of Figure 5 so far has covered satellite or mobile stations under control of station control pulses transmitted from a master station. The description of Figure 5 when used as a master station will follow: At a master station in a radiophone system it is necessary to transmit the station control pulses produced in the circuits of Figure 4 and also to communicate with subscribers and extend communication paths from the subscribers to other radiophone subscribers or telephone subscribers.

At the transmitter 156 the switch 223 may be actuated to connect the signal preamplifiers 224, 225, 226 and 227, which may be similar to the amplifier 206, to the modulation amplifier 208. The amplifier 227 receives four station control pulses from the conductor 103, and after suitable amplification these pulses are supplied to the modulation amplifier. In a master station all timing pulses may be produced in the circuits of Figure 4. The switch 158 would be moved to its first position, and second period timing pulses received over conductors 126 through 129 may control the preamplifiers 206, and 224 through 226 one at a time to supply electrical signals to the modulation amplifier 208 for the different multi-channel paths. The first period timing pulses from conductor 110 may render the preamplifier 227 conductive during the periods that station control pulses are received over the conductor 103. The power amplifier 210 may be rendered conductive during periods for transmitting station control pulses and message signals as determined by the transmitter timing pulses or the first and second period timing pulses received over conductor 133 and applied to the grid 211. Dialing signals may be initiated for any one of the multi-channel paths through switches 216, 228, 229 or 230 by manipulation of the dial 215. One unit of each amplifier 206, 224, 225 and 226 may be under control of receiver or third period timing pulses received over conductors 148 through 151 to control these amplifier units in a manner similar to that described for the right unit of tube 206 for supplying the dialing signals to the modulation amplifier 208.

The receiver timing pulses from conductors 148 through 151 may be fed to an amplifier stage 231 to in turn supply the pulses through switch 232 to the grid 222 to control the transmission of the dialing signals as previously explained for the mobile station.

At the receiver 157 the station selecting pulse circuits including tubes 171, 172, 189, etc. would not be required in a master station. Switch 233 would be moved to connect the power amplifiers 234, 235 and 236, which may be similar to the amplifier 166, to the conductor 165 so that electrical signals received over four multi-channel paths may be separated by the amplifiers 166, and 234 to 236, which are under control of receiver timing pulses received over conductors 148 through 151.

Message signal output of the amplifiers 166, 234, 235 and 236 may be applied to the master station terminal equipment 237 through 240 respectively, whereby an operator at the master station may signal and talk to a party at any other station in the system or establish a talking path to subscribers of other radio-phone systems, or to telephone subscribers, as will be explained in connection with Figures 6 and 7. Keys 204, 241, 242 and 243 may be used to transmit signaling currents over the different paths. The alternating current ringing signals for each path may be from the supply 201 or ringing current of a different frequency may be supplied for each path from different sources of alternating current. For instance the frequency of the alternating current produced at 201 and 244 may be different.

Dialing signals received at a mobile station through the right unit of the power amplifier 166 may be under control of transmitter or third period timing pulses received from the brush 245, which may be fed through switch contacts engaged by brush 246 and applied to the grid 247. In master stations third period timing pulses from the conductors 148 through 151 may control one unit of the power amplifiers 166, 234, 235 and 236 for controlling the reception of dialing signals or interrupted alternating current.

For urban or small radio-phone systems the alarm bells in the mobile or satellite stations may be omitted and the different stations alerted by dialing the number of a desired station which may produce code tones in all the loud speakers in a multi-channel path group. Code numbers may be assigned to the different mobile stations. For instance, dialing the digit 2 may produce two pulses of pulsating current or two pulses of tone in the loud speakers; dialing the digits in the number 12 may produce one pulse tone, a pause, followed by two pulses of tone. A still more economical system may be provided by eliminating the dialing apparatus and use voice paging to call the desired subscriber. The switch 197 has been provided to show connection to the several output devices but in actual practice no more than one ringing device would be used at any mobile station and the switch 197 may be actuated by removing the microphone from the switch hook (not shown) to control only the desired signal reproducing devices and to connect the vehicle source of power to the transmitter for the tube filaments and to connect plate voltage from the high voltage supply 249 to the transmitter.

In the systems described above I have shown each multi-channel path as comprising three recurring periods of time, a first period for transmitting station control pulses, a second period may be for transmitting message signals from the master station and the mobile station in two carried systems and a third period may be for transmitting message signals from the mobile station or dialing signals from both the master and mobile stations. However, the third period may be utilized for transmitting message signals and the second period for the reception of message signals at the master station. It is to be understood that provision may be provided for other recurring periods of time channels in each multi-channel path as desired for other sets of signals.

Figures 6, 7:
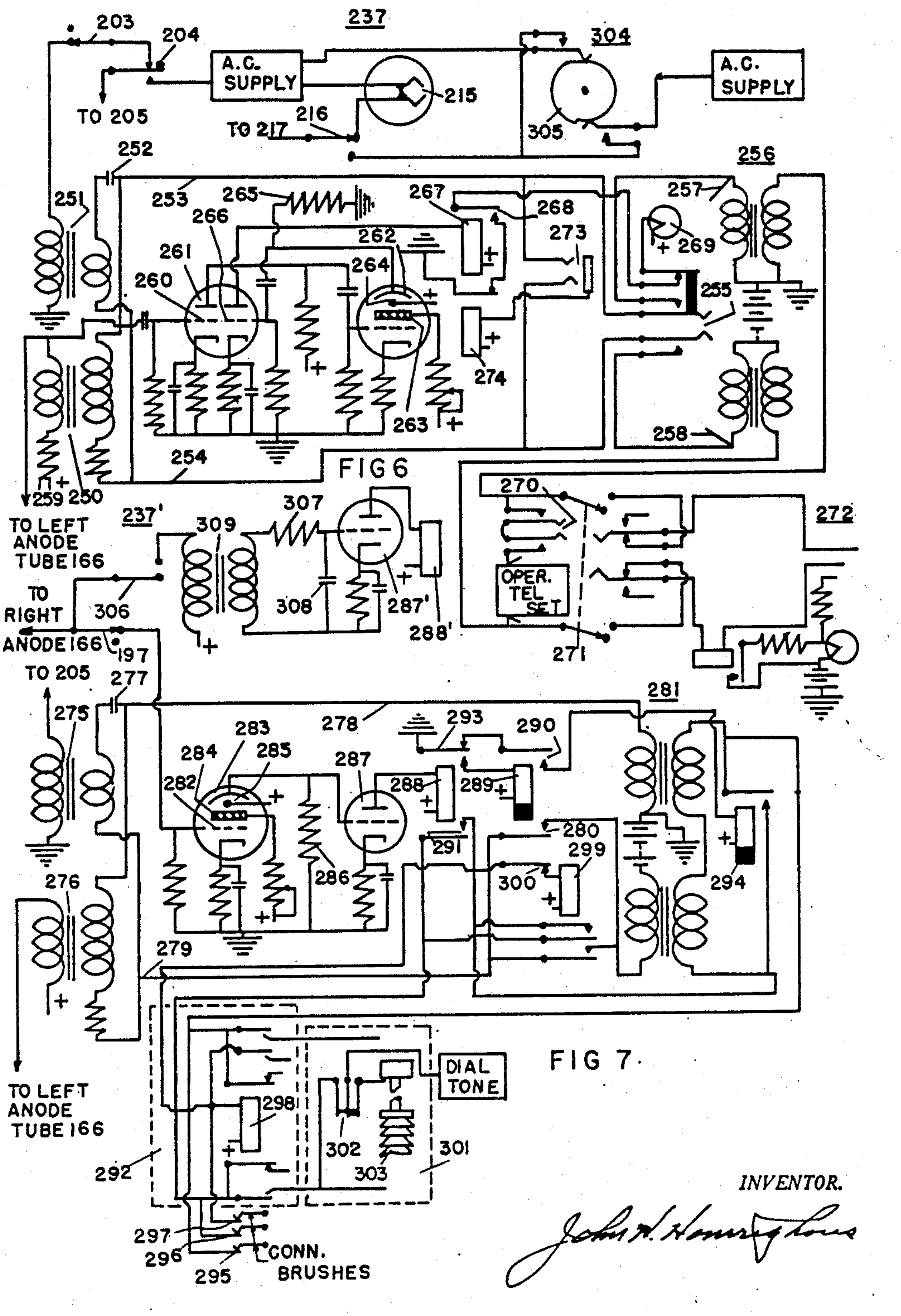
Figure 6 shows multi-channel path master station terminal equipment.
Figure 7 shows multi-channel path master station terminal equipment for actuating machine switching equipment.

Figure 6 shows the master station terminal equipment 237 which may be any one of the equipments shown at 238, 239 or 240 in Figure 5. This equipment may comprise a transformer 250 having its primary winding connected in the anode circuit of one of the power amplifiers shown in Figure 5 such as the amplifier 166, and another transformer 251 having its secondary winding connected to the grid 205 in the preamplifier 206 or to one of the grid circuits in the preamplifier 224, 225 or 226 in Figure 5. The primary winding of transformer 251, connected in series with a condenser 252 to the tip and ring conductors 253 and 254, provides a low impedance path for outgoing signals around the secondary winding of the transformer 250 which is also connected to the conductors 253 and 254. The conductors 253 and 254 may extend through make contacts of key 255 to a repeating coil 256 which may be common to the other terminal equipment or the coil may be connected to the other terminal equipments at leads 257 and 258.

To signal an operator at the master station alternating current may be transmitted from a calling station as previously explained. These signals of pulsating current may be received at the primary winding of the transformer 250 producing voltage changes at resistor 259 which in turn may be applied to the control grid 260 in tube 261. After amplification in this tube the signals may be applied to the control grid of the slow acting tube 262 to in turn cause the anode 263 to glow. Due to the lag in decay of the fluorescence material on the anode 263 its brilliancy will be substantially constant while the pulsating signals are being received and it will not respond to the time division channel interruptions. The glow from the anode 263 may excite the photocell 264 to cause current to flow through load resistor 265 thereby, increasing the potential on grid 266 in tube 261 to in turn cause current to flow through relay 267. Relay 267 upon energizing closes at contacts 268 a circuit through the lamp 269 to battery causing the lamp to glow thereby notifying an operator of a waiting call. The operator may answer the call by actuating the key 255 extinguishing the lamp 269 to connect the conductors 253 and 254 through the key to the repeating coil 256, and by actuating the key 270 she may communicate with the calling subscriber.

In calling a subscriber from the master station the operator may cause ringing current to be transmitted by operation of the key 204. A different frequency of ringing current may be supplied from each terminal equipment. Through the switch 216 dial interrupted alternating current signals may be supplied to the grid 217 in tube 205 to transmit dial pulses over a separate channel to signal a called party by tone, or the dial pulses may cause the operation of a code ringing selector at the called station as explained above.

Now assume that the master station is located in a telephone office and a calling subscriber desires connection with a land wire or telephone subscriber, then the operator may actuate the key 271 to connect the repeating coil 256 through a ringing key to the tip and ring of a removable plug 272 for straight forward operation, in telephone nomenclature, whereby, any telephone subscriber may be reached by plugging into the desired line jack or trunk line.

Instead of the straight-forward method a jack 273 may be provided for answering or originating a call through a conventional cord circuit (not shown). The relay 274 may be operated over the sleeve circuit to disconnect the lamp 269.

Figure 7 shows the master station terminal equipment for establishing connections with automatic telephone subscribers' and may replace any one of the terminal equipments 237, 238, 239 and 240 shown in Figure 5. This equipment may comprise a transformer 275 having its secondary winding connected to the control grid of any one of the preamplifiers in Figure 5 such as the grid 205 in amplifier 206, and another transformer 276 having its primary winding connected to the anode in the left unit of amplifier 166. The primary winding of transformer 275 may be connected in series with a condenser 277 to provide a low impedance path shunting the secondary winding of transformer 276 across the tip 278 and ring 279 conductors extending through make contacts 280 to the repeating coil 281 for two way communication.

From the anode in the right unit of tube 166, switch 197, Figure 5, pulsating signals may be received as a result of closing a switch, such as switch 216, at the transmitter in a mobile station. These signals applied to the grid 282 in slow acting tube 283 may cause the anode 284 to glow to in turn cause current to flow through the photo-electric cell 285 and resistor 286. The increase in voltage at resistor 286 may be applied to the control grid in tube 287 to render this tube conductive, thereby energizing the pulsing relay 288. Relay 288 upon energizing closes a circuit to the slow to release relay 289 which in turn closes contacts 280 to extend the tip and ring conductors through the repeating coil 281 and battery. Relay 288 upon energizing closes a circuit at contacts 291 through one side of the repeating coil to the line switch indicated at 292.

Interrupting the alternating current at the calling station by manipulation of the dial in accordance with the digits in the number of a desired telephone subscriber may cause interruptions in the current through the photocell 285, the brilliancy of anode 284 remaining substantially constant during the relatively high frequency of the channel interruptions. The relay 288 may respond to these current interruptions caused by manipulation of the dial to open and close a circuit from ground at spring 293 and its break contact through make contacts 290 of slow-to-release relay 289, which remains operated during dialing pulses, and through relay 294 to battery. Relay 294 may remain operated during reception of dial pulses to shunt the repeating coils during interruption of the line circuit to the step by step switches at contacts 291, whereby, the machine switching mechanisms may be actuated in accordance with the digits dialed to establish a communication link to a called land wire station.

From the above description it has been shown that the direct current line or pulsing relay 288 remains energized as a result of alternating current transmitted over a separate time division channel during message signal transmission over other time division channels, which provides a novel and economical method for actuating machine switching telephone mechanisms over carrier waves.

Terminals 295, 296 and 297 may be provided in the connector bank, whereby, a land wire station dialing the number of a desired mobile station may be connected through step by step switches and these connector terminals to the multi-channel carrier wave path terminal equipment 237'. Ground from the connector brush and terminal 297 may cause energization of cut off relay 298 and relay 299. Relay 299 closes the line conductors through the repeating coil when the equipment 237' is seized by a dial actuated switch. The circuit through relay 299 is opened at contacts 300 when a call is originated through a mobile station.

Ringing current may be automatically applied to the called land wire station or to a radio station from the final or connector switch as explained in the above mentioned references.

At the first selector 301 dial tone through off normal springs 302 may be applied to one side of the line which in turn may be transmitted over the carrier wave path to notify the mobile subscriber to start dialing. The tone may be disconnected at springs 302 upon the first vertical step of the selector shaft 303 responsive to first dial pulse received.

The code ringing selector 200, Figure 5, may be actuated by alternate pulses of alternating current of different frequencies controlled by a dial 304 which may be substituted for the dial 215 by movement of the switch 216, Figure 5. The dial 304 may have a cam 305 rotated similar to the cam (not shown) for the conventional dial 215, but arranged to apply two different frequencies alternately to the control grid 217 in order to operate one of the conventional ringing selectors which may be the selector illustrated at 200. This method of transmitting dialing pulses of two different frequencies of alternating current, over a separate channel in each multi-channel path may be employed in the instant case to actuate the machine switching mechanism instead of the preferable method shown in Figure 7.

An individual step by step connector switch such as shown at block diagram 33, Figure 1, may be employed at each mobile station with the pulsing circuit of Figure 7 to actuate the connector shaft vertically and horizontally to cause the brush to connect to a different set of bank contacts for each different station number dialed. Only one set of bank contacts in each connector which would correspond to the station number is connected to a bell.

Through the operation of the switch 306 a modification of the dialing or pulsing circuit described above may utilize a time constant circuit comprising a resistor 307 and condenser 308 instead of the slow acting tube 283. The values of resistance and capacitance being such that the time constant is long compared with the time division channel repetition interval. Alternating current signals received through the right anode circuit of the amplifier 166 may be supplied through the transformer 309 to the grid of tube 287', thereby causing energization of the relay 288' which may be substituted for the relay 288. Pulsing or interrupting the alternating current at a calling station by a dial similar to the dial 215 may cause the relay 288' to be actuated in accordance with the digits dialed to in turn cause operation of the ringing selector of the telephone machine switching equipment as described for the relay 288.

From the above description it has been shown that mobile subscribers and land wire telephone subscribers may be interconnected for two-way communication over multi-channel carrier wave paths through machine switching mechanisms actuated by manipulation of a dial at either the mobile station or the land wire station.

In the various circuits shown and described I have simplified the drawings by indicating the source of potential in certain cases by a sign. Also I have omitted the heater filaments for the various tubes, but it will be understood that such filaments are necessary.

The embodiments of the invention which have been given herein are illustrations of ways the various features may be accomplished and of the principles involved. It is to be understood that the invention contained herein is capable of embodiment in many other forms and adaptations, without departing from the spirit of the invention and the scope of the appended claims.

Having thus described my invention I claim:

1. In a communication system, a transmitter receiver station, apparatus and suitable circuits in said station to receive a plurality of recurring station control pulses, means including a manually operable member to select a first one of said recurring station control pulses, means including an electron tube having a pulse delay element responsive to the selected said first recurring station control pulse to produce a first recurring timing pulse following said first recurring station control pulse, means including a first amplifier responsive to said recurring timing pulse to control reception of first message signals, means including another electron tube having a pulse delay element responsive to said first recurring timing pulse to produce a second recurring timing pulse, and means including a second amplifier responsive to said second recurring timing pulse to control the transmission of second message signals following the reception of said first message signals.

2. In a radio-phone system, a first transmitter receiver station, an oscillator to produce a carrier wave, a source of alternating current, a rotatable dial for interrupting the alternating current from said source, a mobile transmitter-receiver station numerically designated, a multi-position ringing selector switch at said mobile station, a station alarm member connected to said switch, means at said first station including an amplifier to transmit said carrier wave modulated with pulses representative of said alternating current interrupted according as said dial is rotated in accordance with the digits in the number of the said mobile station, means at said mobile station to receive said pulses, and a relay associated with said ringing selector switch responsive to said pulses to cause step-by-step operation of said ringing selector switch to a position according to the number of said mobile station to in turn cause operation of said alarm member.

3. In a radio communication system, a plurality of radio stations, means associated with each of the said stations to receive a plurality of recurring station control pulses, each of the said recurring station control pulses for a different one of said stations and having a characteristic, individual to such station, a plurality of electron tubes associated with a first one of said stations, means at said first station including a multi-position switch to utilize one, two or three of said tubes according to the position of the switch to select one of said recurring station control pulses for a second one of said stations, means associated with said first station including a first member responsive to said one recurring station control pulse to produce a first train of timing pulses, and means at said first station including a first amplifier under control of said first train of timing pulses to transmit signals representative of a message for said second station.

4. A communication system as claimed in claim 3 wherein there is provided means at said first station including a second member responsive to said first train of timing pulses to produce a second train of timing pulses, and means at said first station including a second amplifier under control of said second train of timing pulses to receive message signals representative of another message.

5. A communication system as claimed in claim 3 wherein there is provided means associated with said second station including a second member responsive to said one recurring station control pulse received thereat to produce a second train of timing pulses, and means at said second station including a second amplifier under control of said second train of timing pulses to transmit signals representative of a message for said first station.

6. In a communication system, a first radio station, means associated with said station to receive a plurality of recurring station control pulses, each of the said recurring station control pulses for a different station and having a characteristic individual to such station, a plurality of electron tubes associated with said first station, means at said first station including a multi-position switch to utilize one or two of said tubes according to the position of the switch to select one of said recurring station control pulses for a second station, means associated with said first station including members responsive to said one recurring station pulse to produce at least two sets of recurring timing pulses, and means at said first station including at least two amplifiers under control of said timing pulses to transmit signals during a recurring period of time and to receive other signals during a different recurring period.

7. A communication system as claimed in claim 6, and in addition there is a telephone office, said second radio station in said office, a land line, provided with a telephone station, terminating in said office, a plurality of automatic trunking switches in said office, a relay associated with said trunking switches responsive to said signals transmitted from said first stations to in turn cause said switches to be actuated to interconnect said second station with said land line, thereby providing a communication channel between said first station and said telephone station.

8. In a radio communication system, a plurality of radiophone stations, a radio-phone office having a generator to produce different recurring station pulses, each of the said recurring pulses for a different one of said stations, means at said office including a space transmitter to transmit said recurring station pulses, means at each of the said stations to receive said recurring station pulses, a plurality of electrical devices at a first one of said stations, means at said first station including a multi-position switch to utilize one or two of said devices according to the position of the switch to select one of said recurring station pulses for a second one of said stations, a space transmitter at said first station including pulse delay means under control of said one recurring station pulse to intermittently transmit signals for said second station.

9. In a radio communication system, a first radio-phone station, a radio-phone office having generator means to produce different recurring station pulses, each of the said recurring pulses for a different station, means at said office including a space transmitter to transmit said recurring station pulses, a second radio-phone station, means at each of the said stations to receive said recurring station pulses, a plurality of electron tubes at said first station, means at said first station including a multi-position switch to apply said recurring station pulses to a different set of said tubes according to the position of the switch to select one of said recurring station pulses for said second station, a calling device for said first station, a space transmitter at said first station including pulse delay means under control of said one recurring station pulse to transmit signals, according as said calling device is manipulated, for said second station, an alarm member at said second station, and an automatic selector switch at said second station responsive to said signals received thereat to cause said alarm member to be actuated.

10. In a radio-phone communication system, a first radio-phone station, a radio-phone office having generator means to produce different recurring station pulses, each of the said recurring pulses for a different station, means at said office including a space transmitter to transmit said recurring station pulses, a second radio-phone station, means at each of the said stations to receive said recurring station pulses, a plurality of electron tubes at said first station, means at said first station including a multi-position switch to apply said recurring station pulses to different said tubes according to the position of said switch to select one of the said recurring station pulses for said second station, a space transmitter at said first station including pulse delay means under control of said one recurring station pulse to transmit signals, an alarm member at said second station, means at said second station including an electron tube rendered conductive in response to said one recurring station pulse received thereat to receive said signals for actuating said alarm member.

11. In a radio-phone communication system, a first radio-phone station, a radio-phone office having generator means to produce a plurality of different recurring station pulses, each of the said recurring pulses for a different station, means at said office including a space transmitter to transmit said recurring station pulses, a second radio-phone station, means at each of the said stations to receive said recurring station pulses, a plurality of electron tubes at said first station, means at each of the said stations, including a multi-position switch at said first station to apply the received said recurring station pulses to a different set of said tubes according to the position of the switch, to select a certain one of said recurring station pulses, a space transmitter at said first station including pulse delay means under control of the selected said certain recurring station pulse to transmit signals, means at said second station including an amplifier responsive to the selected said certain recurring station pulse to receive said signals.

12. A communication system as claimed in claim 11, and in addition there is provided an alarm member at said second station responsive to said signals to produce a waiting call signal.

13. A communication system as claimed in claim 11, and in addition there is provided an alarm member at said second station responsive to said signals to produce a waiting call signal and a signal responsive device responsive to said signals subsequently received to reproduce a message.

14. In a radio-phone communication system, a first radio-phone station, a radio-phone office having generator means to produce a plurality of different recurring station pulses, each of the said recurring station pulses for a different station, means at said office including a space transmitter to transmit said recurring station pulses, a second radio-phone office, means at each of the said stations to receive said recurring station pulses, a plurality of electron tubes at each of the said stations, means at each of the said stations including a multi-position switch to apply the received said recurring station pulses to a different set of said tubes according to the position of the switch to select a certain one of said recurring station pulses, a space transmitter at said first station including pulse delay means under control of the selected said certain recurring station pulse to transmit signals, and an amplifier at said second station responsive to the selected said certain recurring station pulse to receive said signals.

15. A communication system as claimed in claim 14, and in addition there is provided an alarm member at said second station responsive to said signals to produce a waiting call signal.

16. A communication system as claimed in claim 14, and in addition there is provided an alarm member at said second station responsive to said signals to produce a waiting call signal, and a signal responsive device responsive to said signals subsequently received to reproduce a message.

17. In a radio communication system, a radio station, means associated with said station to receive a recurring station control pulse, means including a pulse delay member responsive to said recurring station pulse to produce a recurring timing pulse, a source of relatively low frequency of alternating current and a source of relatively high frequency of alternating current at said station, an amplifier, a calling device associated with said station capable of being rotated to alternately apply said low frequency of alternating current and said high frequency of alternating current to said amplifier, and means including the said amplifier under control of said recurring timing pulse to transmit fragmentary portions of both of the said alternating currents in successive rotation according as said calling device is rotated for the different characters in the number of a called station.

18. In a radio communication system, a radio station, means associated with said station to produce a recurring timing pulse, means at said station to produce alternating current of relatively low frequency, means at said station to produce alternating current of relatively high frequency, an amplifier, a calling device associated with said station capable of being actuated to alternately apply said low frequency of alternating current and said high frequency of alternating current to said amplifier, and means including the said amplifier and another amplifier under control of said recurring timing pulse to transmit signals representative of both of the said alternating currents in successive rotation according as said calling device is actuated for the different digits in the number of a called station.

19. A communication system as claimed in claim 14 wherein the said different recurring station pulses consist of both positive amplitude pulses and negative amplitude pulses.

20. In a radiophone system, means to receive a number of recurrent station control pulses of different amplitude, means including a multi-position switch to select according to the position of said switch, any one of said recurrent control pulses exclusive of all the other said recurrent control pulses, a calling device, means including pulse producing devices and suitable circuits responsive to the said selected recurrent control pulse to produce recurrent timing pulses in successive rotation to control the transmission and reception of message signals and the transmission of signals interrupted by manipulation of said device.

21. In a communication system, a first radio-phone station, a telephone office, a second radio-phone station in said office having generator means to produce different recurring station pulses, each of the said recurring pulses for a different radio-phone station, means at said second station including a space transmitter to transmit said recurring station pulses, means at said first station to receive said recurring station pulses, a plurality of electron tubes at said first station, means at each of the said stations, including a multi-position switch at said first station to apply the received said recurring station pulses to a different set of said tubes according to the position of the switch, to select a certain one of said recurring station pulses, a calling device for said first station, a space transmitter at said first station including pulse responsive means under control of said certain recurring station pulse to transmit signals, according as said calling device is manipulated, means in said second station under control of said certain recurring station pulse selected thereat to receive said signals, a telephone line terminating in said office provided with a telephone station, a plurality of machine switching mechanisms in said office, a relay associated with said mechanism responsive to said signals to cause said mechanisms to be actuated to interconnect said second station and said telephone line for providing a communication channel between said first station and said telephone station.

22. In a communication system, a first radio-phone station, a telephone office, a second radio-phone station in said office having generator means to produce a recurring station pulse, a first recurring timing pulse and a second recurring timing pulse, means at said second station including a space transmitter to transmit said recurring station pulse, pulse responsive means at said first station responsive to the received said recurring station pulse to produce a first recurring timing pulse and a second recurring timing pulse occurring at the same time as the recurring timing pulses produced at said first station, a telephone line terminating in said office provided with a numerically designated telephone station, a plurality of automatic trunking switches in said office, a relay associated with a first one of said switches, means including an amplifier at each of the said radio-phone stations under control of the said second recurring timing pulses to cause transmission of signals from said first station and cause reception of the signals at said second station during a second recurring period of time, to energize said relay to in turn close a circuit to said first switch, a dialing device at said first station capable of being rotated, according to the number of said telephone station, to interrupt said signals, said relay responsive to the interrupted signals to cause a train of said switches to be actuated to interconnect said second station and said telephone line, and means including another amplifier at each of the said radio-phone stations under control of said first recurring timing pulses to cause transmission of signals representative of a message during a first recurring period from said first station and to cause reception of said last mentioned signals at said second station for transmitting through said first switch and said train of switches over said telephone line for reproduction at said telephone station.

23. A communication system according to claim 22, and in addition there is provided a source of tone signals at said telephone office, a gate amplifier at each of the said stations, and means following energization of said relay including said gate amplifiers under control of said first recurring timing pulses to cause transmission of signals from said source during said first recurring period to inform the calling party at said first station by a distinctive tone that he may start dialing the number for the desired telephone subscriber.

24. A communication system according to claim 22, and in addition there is included in the energizing circuit for said relay a pulse delay network having a relatively long time constant as compared with the interval between said recurring timing pulses.

25. A communication system according to claim 22, and in addition there is provided a source of tone signals at the last switch in said train of switches, a gate amplifier at each of the said stations, and means including said gate amplifiers under control of said first recurring timing pulses to cause transmission of signals from said source during said first recurring period, if said line is busy, to inform the calling party at said first station by a distinctive tone that the called telephone line is busy.

26. A communication system according to claim 22, and in addition there is provided means including a gate amplifier at each of the said radio phone stations under control of said first recurring timing pulses to cause transmission of speech signals representative of a return message from said second station during said first recurring period and to cause reception of the speech signals at said first station for reproduction.

27. In a communication system, a first radiophone station numerically designated, a telephone office, a second radio-phone station in said office having generator means to produce a recurring station pulse and a first recurring timing pulse, means at said second station including a space transmitter to transmit said station recurring pulse, means at said first station to receive said recurring station pulse, pulse responsive means at said first station responsive to said recurring station pulse to produce a first recurring timing pulse occurring at the same time as the said recurring timing pulse produced at said second station, a telephone line terminating in said office provided with a telephone station having a rotatable dial, a plurality of automatic trunking switches in said office capable of being actuated by received telephone line signals interrupted by rotation of said dial in accordance with the number of said first station to interconnect said telephone line and said transmitter in the said second station, means following dial rotation to transmit speech signals representative of a message from said telephone station to said second radio-phone station, and means including an amplifier at each of the said radio-phone stations under control of said first recurring timing pulses to cause transmission of fragmentary portions of said speech signals from said second station during a first recurring period of time and to cause reception of said fragmentary portions of the speech signals at said first station for reproduction.

28. A communication system as claimed in claim 27, and in addition the said generator means and the said pulse responsive means to produce a second recurring timing pulse at each of the said radio-phone stations and means including another amplifier at each of the said radio-phone stations under control of said second recurring timing pulses to cause transmission of sound signals representative of a return message from said first station during a second recurring period and to cause reception of the sound signals at said second station for transmitting to said telephone line.

29. In a communication system, a first radiophone station, a telephone office, a second radiophone station in said office having generator means to produce a recurring station pulse, and a recurring timing pulse, means at said second station including a space transmitter to transmit said station pulse, means at said first station to receive said recurring station pulse, pulse responsive means at said first station including a pulse delay device responsive to said received recurring station pulse to produce a first recurring timing pulse occurring during the same recurring period of time as the timing pulse produced at said second station, and means including an amplifier at each of the said radiophone stations under control of said first timing pulses to cause transmission of signals from said first station during a first recurring period of time and to cause reception of the signals at said second station, an alarm member at said second station, and a relay associated with said second station responsive to said signals to cause said alarm member to be actuated to produce a waiting call signal.

30. A communication system as claimed in claim 29 and in addition there is a third radiophone station in said office, means at said third radiophone station to produce a second recurring station pulse for a group of satellite radiophone stations, means at said third station including another space transmitter to transmit said second recurring station pulse, means at a first one of said satellite stations to receive said second recurring station pulse, means including a gate amplifier at said third radiophone station and another gate amplifier at said first satellite station responsive to said second recurring station pulse to cause periodic transmission and reception of signals representative of a message at the respective stations, and means including a plug associated with said second station and a jack associated with said third station to interconnect said second and said third station for communication between said first station and said first satellite radiophone station.

31. In a communication system, a plurality of stations, means at each of the said stations for producing a train of pulses modulated in accordance with intelligence to be transmitted from such station, means to transmit the pulses from a first group of said stations to a second group of said stations, means to transmit the pulses from said second group of stations to said first group of stations in successive rotation with the pulses transmitted from said first group of stations, a plurality of electron tubes at a first station in said first group, and means at said first station including a multi-position switch to utilize different sets of said tubes according to the position of the switch to produce a different train of pulses in each position of the switch for transmitting to any station in said second group.

32. In a radiophone transmitter-receiver station, means to produce a carrier wave, pulse responsive means responsive to a recurring station pulse, received during a first recurring period of time, to produce a first recurring timing pulse, and means including a pulse delay device under control of said first recurring timing pulse to produce a second recurring timing pulse, said first recurring timing pulse, occurring during a second recurring period delayed relative said first recurring period, to control transmission of said carrier wave solely during said second recurring period modulated with signals representative of a message, said second recurring timing pulse, occurring during a third recurring period delayed relative said second recurring period, to control reception of another carrier wave solely during said third recurring period modulated with signals representative of a return message.

33. In a communication system, a first radio transmitter-receiver station, means associated with said station to produce a carrier wave, a source of alternating current, means associated with said station including a space transmitter to transmit fragmentary portions of said alternating current modulated on said carrier wave during a first recurring period of time, a telephone office, a telephone station wire line extending from said office having a numerically designated telephone station connected thereto, a calling device associated with said radio station to interrupt the alternating current from said source, according as said device is rotated in accordance with the different digits in the number of said telephone station, to cause interruptions in said fragmentary portions of alternating current being transmitted, a second radio station in said telephone office to receive said fragmentary portions of alternating current, a number of automatic trunking switches in said telephone office, a relay in said second radio station, means in said second radio station including an electrical device responsive to the received said fragmentary portions of alternating current to cause energization of said relay and responsive to said interrupted fragmentary portions of alternating current to intermittently deenergize said relay to cause said switches to be actuated to interconnect said second radio station and said wire line to provide a communication channel betwen said first radio station and said telephone station comprising a second recurring period of time over said carrier wave.

34. In a communication system, a first numerically designated radio station, a telephone office, a second radio station in said telephone office, a telephone station wire line extending from said office having a telephone station connected thereto, a plurality of automatic trunking switches in said telephone office, a calling device associated with said telephone station, electro-magnetic means associated with said switches responsive to pulses of current from said wire line, according as said device is rotated, in accordance with the different digits in the number of said first radio station, to actuate said switches to interconnect said wire line and said second radio station for the reception of signals at said second radio station from said telephone station, means at said second radio station to produce a carrier wave capable of reception at said first radio station, means at said second radio station including a pulse generator to produce a recurring timing pulse, a gate amplifier at said second radio station, a source of ringing signals at one of said switches, and means including said gate amplifier under control of said recurring timing pulses to cause periodic transmission of fragmentary portions of ringing current from said source modulated on said carrier wave with periodic transmission of signals representative of a message from said telephone station following ringing signal transmission.

35. In a communication system, a transmitter-receiver station, means at said station to receive a number of different recurring station control pulses, means at said station including apparatus and associated circuits to select a first one of said recurring station control pulses, occurring during a first recurring period of time, to produce a recurring timing pulse to control the selection of a second recurring period for the reception of first message signals, and means at said station including other apparatus and associated circuits responsive to said recurring timing pulse to control the selection of a third recurring period for the transmission of second message signals.

36. In a radiophone system, a transmitter-receiver station, an oscillator associated with said station to produce a first carrier wave, means at said station to receive a second carrier wave modulated with a plurality of different recurring station control pulses and signals representative of a first message, means at said station including apparatus and associated circuits to select a first one of said recurring station control pulses to produce a first recurring timing pulse thereby controlling the selection of a first recurring period of time for the reception of said signals and for transmission of signals representative of a second message over said first carrier wave, and means at said station including other apparatus and associated circuits responsive to said first recurring timing pulse to produce a second recurring timing pulse, thereby controlling the selection of a second recurring period for transmission of other signals over said first carrier wave.

37. A radiophone system as claimed in claim 36, and in addition there is provided a source of alternating current, and means including an amplifier under control of said first recurring timing pulse to transmit alternating current signals from said source modulated on said first carrier wave during said first recurring period.

38. A radiophone system as claimed in claim 36, and in addition there is provided a source of alternating current, means including a calling device to produce interrupted alternating current signals from said source, according as said calling device is manipulated for the different characters in the number of a called station, and means including an amplifier under control of said second recurring timing pulse to transmit said interrupted alternating current signals modulated on said first carrier wave during said second recurring period.

39. In a radiophone system, a transmitter-receiver station, an oscillator associated with said station to produce a first carrier wave, means at said station to receive a second carrier wave modulated with a plurality of different recurring station control pulses and signals representative of a first message, means at said station including a multi-position switch to select a first one of said recurring station control pulses, means at said station including apparatus and associated circuits under control of the selected first recurring station control pulse to produce a first recurring period of time for reception of said signals, and means at said station including other apparatus and associated circuits under control of said recurring timing pulse to control the selection of a second recurring period for transmission of other signals over said first carrier waves, and means including an amplifier under control of said second recurring timing pulse to transmit said other signals.

40. In a communication system, a transmitter-receiver station, pulse generator means at said station to produce a number of series of station control pulses, each of the said series of station control pulses occurring in a different recurring period of time for transmission during the same recurring period, said pulse generator means to produce in successive rotation with each of the said series of station control pulses a first train of timing pulses and a second train of timing pulses, and means including first and second amplifiers under control of said first timing pulse and said second timing pulse respectively to control message signal transmission and reception.

41. In a radiophone system, a transmitter-receiver station, pulse generator means associated with said station to produce a plurality of recurring station control pulses, a plurality of transmitter recurring timing pulses and a plurality of receiver recurring pulses, means including an amplifier under control of said station control pulses to transmit said station control pulses, means including first and second amplifiers under control of a first one of said transmitter recurring timing pulses and a first one of said receiver timing pulses respectively to control message signal transmission and reception.

42. In a radiophone system, a transmitter-receiver station, an oscillator associated with said station to produce a carrier wave, means at said station including a pulse generator to produce a number of series of station control pulses, a number of series of transmitter timing pulses and a number of series of receiver timing pulses, means to transmit said station control pulses over said carrier wave, said last means including a first amplifier under control of a first one of said series of transmitter timing pulses to transmit signals representative of a message over said carrier wave, and a second amplifier under control of a first one of said series of receiver timing pulses to receive signals representative of another message over another carrier wave.

43. In a radio communication system, a plurality of radio stations, means at each of the said stations to receive a recurring station control pulse, means at each of the said stations including an electron tube under control of the received said recurring station pulse to produce a channel recurring timing pulse, means at each of the said stations including said first means, and an amplifier under control of said recurring timing pulses to receive at different intervals different sets of signals, and an alarm device at each of the said stations responsive to a different set of said signals to produce a waiting call signal.

44. In a communication system, a radio station, means at said station to receive a recurring station control pulse, means at said station including an electron tube under control of the received said recurring station control pulse to produce a channel recurring timing pulse, means including said first means, and an amplifier under control of said recurring timing pulse to receive at different intervals different sets of signals, and an alarm device responsive to only one set of said signals to produce a waiting call signal.

JOHN H. HOMRIGHOUS.

REFERENCES CITED

The following references are of record in the file of this patent:

UNITED STATES PATENTS

| Number | Name | Date |
|---|---|---|
| 1,608,551 | Demarest et al. | Nov. 30, 1926 |
| 2,093,847 | Pruden | Sept. 21, 1937 |
| 2,406,165 | Schroeder | Aug. 20, 1946 |
| 2,434,697 | Homrighous | Jan. 20, 1948 |
| 2,437,027 | Homrighous | Mar. 2, 1948 |
| 2,447,233 | Chatterjea et al. | Aug. 17, 1948 |